United States Patent [19]

Goebel

[11] 4,033,946
[45] July 5, 1977

[54] TETRAKISAZO DYESTUFFS

[75] Inventor: Hermann Goebel, Leverkusen, Germany

[73] Assignee: Bayer Aktiengesellschaft, Leverkusen, Germany

[22] Filed: Aug. 14, 1972

[21] Appl. No.: 280,146

[30] Foreign Application Priority Data

Aug. 14, 1971 Germany .......................... 2140867

[52] U.S. Cl. .............................. 260/166; 260/178
[51] Int. Cl.$^2$ ......................................... C09B 35/36
[58] Field of Search ........................ 260/166, 168

[56] References Cited

UNITED STATES PATENTS

| 1,078,926 | 11/1913 | Kahn et al. | 260/166 |
| 2,096,896 | 10/1937 | Hauck et al. | 260/166 |

FOREIGN PATENTS OR APPLICATIONS

| 966,768 | 10/1950 | France | 260/166 |
| 1,105,350 | 3/1968 | United Kingdom | 260/166 |
| 1,019,467 | 2/1966 | United Kingdom | 260/166 |

OTHER PUBLICATIONS

*Colour Index*, 2 ed. (1957), vol. 3, p. 3306, Cl. 35445, Cl. 35435 & Cl. 35450.

Primary Examiner—Charles F. Warren
Attorney, Agent, or Firm—Plumley and Tyner

[57] ABSTRACT

The subject matter of the present invention relates to tetrakisazo dyestuffs which in the acid form correspond to the formula

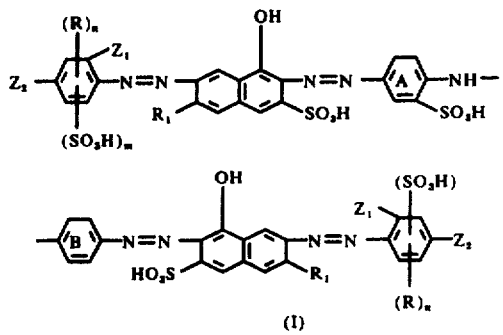

wherein
R = H or substituent,
$R_1$ = H or $SO_3H$
$Z_1$, $Z_2$ = an optionally substituted amino group,
n = 1 or 2
m = 1 or 2, n + m being ≤ 3 and wherein the rings A and B may have further substituents, for example, alkoxy groups such as methoxy groups.

The new dyestuffs are suitable for the dyeing and printing of natural fibre materials, especially leather, and distinguish themselves by good fastness properties.

2 Claims, No Drawings

TETRAKISAZO DYESTUFFS

The subject matter of the present invention relates to tetrakisazo dyestuffs which in the acid form correspond to the formula

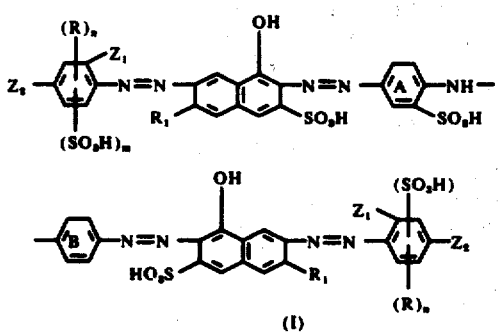

(I)

wherein
R = H or substituent,
$R_1$ = H or $SO_3H$
$Z_1$, $Z_2$ = an optionally substituted amino group,
n = 1 or 2
m = 1 or 2, n + m being ≦ 3 and wherein the rings A and B may have further substituents, for example, alkoxy groups such as methoxy groups.

As substituents R there may be mentioned in particular: opitonally substituted alkyl groups, in particular such with 1–4 C atoms, halogen, in particular chlorine.

The n-substituents R can be the same or different. This likewise applies to the substituents $R_1$ and $Z_1$–$Z_2$. As substituents $Z_1$–$Z_2$ there may be mentioned in particular amino groups as well as aminoalkylamino groups such as $C_1$–$C_4$ alkyl groups, optionally substituted by hydroxyl, sulphonic acid or caboxylic acid groups.

Preferred dyestuffs are those which in the acid form correspond to the formula

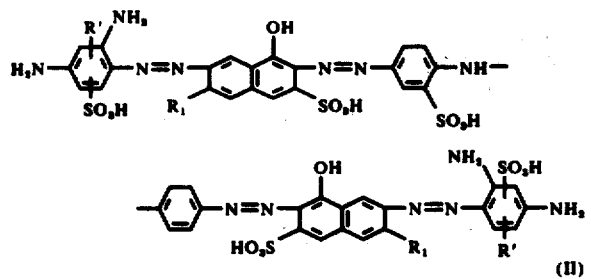

(II)

wherein
R' = H, $CH_3$, Cl
$R_1$ = H, $SO_3H$,
and also those which in the acid form correspond to the formula

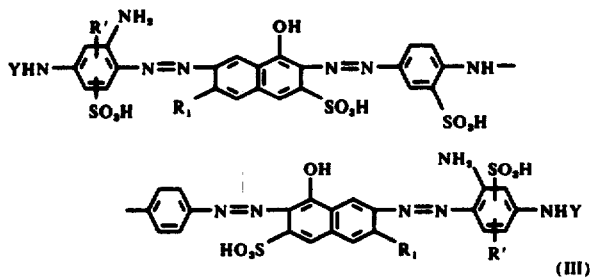

(III)

wherein
Y = $C_1$–$C_4$ alkyl optionally substituted by hydroxy, sulpho or carboxy and
R' = H, $CH_3$, Cl.
$R_1$ = H, $SO_3H$ The new dyestuffs of the formula (I) are obtained by coupling a tetrazotised amine of the formula

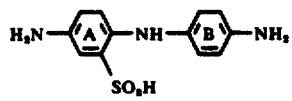

(IV)

with 2 mol of a 2-amino-8-hydroxynaphthalene-sulphonic acid of the formula

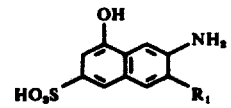

(V)

or with mixtures of different coupling components (V) to yield diaminodisazo dyestuffs of the formula

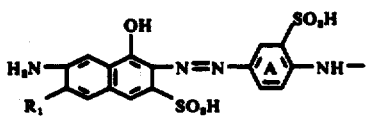

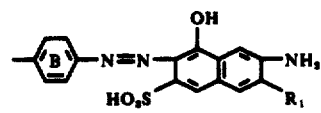

(VI)

wherein
$R_2$ = H or $SO_3H$, the radicals $R_1$ having the same or a different meaning,
by tetrazotising (VI) and coupling onto 2 mol of a coupling component of the formula

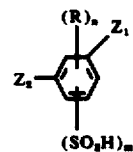

(VII)

wherein
$Z_1$, $Z_2$ = an optionally substituted amino group,
R = H or substituent,
n = 1 or 2
m = 1 or 2, n + m being ≦ 3.

Suitable coupling components (V) are 2-amino-8-hydroxynapthalene-6-sulphonic acid and 2-amino-8-hydroxynaphthalene-3,6-disulphonic acid or mixtures of both.

Suitable coupling components (VII) are for example: 1,3-diaminobenzene-4-sulphonic acid, 1-methyl-2,6-diaminobenzene-4-sulphonic acid, 1-chloro-2,6,-diaminobenzene-4-sulphonic acid, 1-amino-3-hydroxyethylamino-benzene-6-sulphonic acid, 1-methyl-2-hydroxyethylaminobenzene-4-sulphonic acid, 1-methyl-2-caboxy-methylamino-6-aminobenzene-4-sulphoinc acid, 1-methyl-2-sulpho-methylamino-6-aminobenzene-4-sulphoinc acid, 1-chloro-2-caboxymethylamino-6-aminobenzene-sulphonic acid, 1-chloro-2-sulphomethyl-amino-6-aminobenzene-4-sulphonic acid, 1-chloro-2-hydroxymethylamino-6-aminobenzene-4-sulphonic acid, 1-methyl-2,4-diaminobenzene-5-sulphonic acid, 1-methyl-2-hydroxyethylamino-4-aminobenzene-5-sulphonic acid, 1-methyl-2-carboxymethylamino-4-aminobenzene-5-sulphonic acid, 1-methyl-2-sulphomethylamino-4-aminobenzene-5-sulphonic acid, 4,6-diamino-benzene disulphonic acid (1,3).

The new dyestuffs are suitable for the dyeing and printing of natural fibre materials, especially leather. Black dyeings are obtained on leather with good fastness properties.

EXAMPLE 1

28 g of 4,4'-diamino-diphenylamine-2'-sulphonic acid are tetrazotised in a known manner and coupled in an alkaline medium onto 48 g of 2-amino-8-hydroxy-6-sulphonic acid. The resulting diamino-disazo dyestuff is further tetrazotised and coupled in an alkaline medium with 39 g of 1,3-diaminobenzene-4-sulphonic acid. The dyestuff precipitated by the addition of sodium chloride and then isolated is easily soluble in water and dyes leather black. The dyeings possess good fastness properties.

If, instead of the above end components, corresponding amounts of 1-methyl-2,6-diaminobenzene-4-sulphonic acid, 1-chloro-2,6-diaminobenzene-4-sulphonic acid, 1-methyl-2,4-diaminobenzene-5-sulphonic acid or suitable derivatives of these, as given at the beginning, are used, then valuable black dyestuffs are likewise obtained which are particularly suitable for dyeing leather and only differ from one another by slight variations in shade.

EXAMPLE 2

28 g of 4,4'-diamino-diphenylamine-2'-sulphonic acid are tetrazotised in a known manner and coupled in an alkaline medium onto 64 g of 2-amino-8-hydroxynaphthalene-3,6-disulphonic acid. The resulting diaminodisazo dyestuff is further tetrazotised and coupled onto 39 g of 1,3-diaminobenzene-4-sulphonic acid. The dyestuff precipitated by the addition of sodium chloride and then isolated is easily soluble in water and dyes leather black. If 2,6-diaminobenzene-4-sulphonic acid, 1-chloro-2,6-diaminobenzene-4-sulphonic acid or 1-methyl-2,4-diaminobenzene-5-sulphonic acid is employed as the end component, then black, easily soluble dyestuffs are obtained which are especially suitable for dyeing leather.

Unsymmetrically synthesised dyestuffs, which are likewise suitable for dyeing leather, are obtained, if during the end coupling stage half of the amount each of for example 1-chloro-2,6-diaminobenzene-4-sulphonic acid and 1,3-diaminobenzene-4,-sulphonic acid or another suitable component is used. The end components (total of 2 mol) required for the end coupling can also of course be used in any other molar ratio.

EXAMPLE 3

28 g of 4,4'-diamino-diphenylamine-2-sulphonic acid are tetrazotised in a known manner and coupled in an alkaline medium one after the other or simultaneously with 24 g of 2-amino-8-hydroxynaphthalene-6-sulphonic acid and 32 g of 2-amino-8-hydroxynaphthalene-3,6-disulphonic acid. The resulting unsymmetrical diamino-disazo dyestuff is further tetrazotised and coupled in an alkaline medium with 42 g of 1-methyl-2,4-diamino-benzene-5-sulphonic acid. After precipitation by the addition of sodium chloride and isolation the black dye is easily soluble in water and particularly suitable for dyeing leather.

If, for example, 1,3-diaminobenzene-4-sulphonic acid, 1-methyl-2,6-diaminobenzene-4-sulphonic acid or one of the components mentioned at the beginning are used instead of the above end components, then black dyestuffs are also produced having good solubility and particularly good suitability for dyeing leather.

I claim:

1. The tetrakisazo dyestuff which in the acid form correspond to the general formula

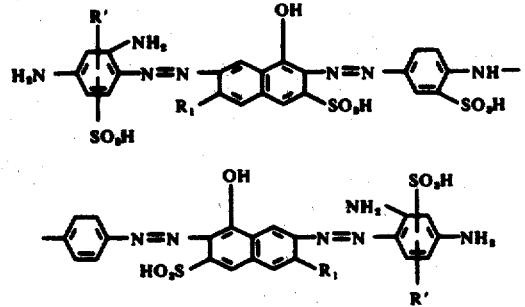

wherein
R' = H, CH$_3$, or Cl
R$_1$ = H or SO$_3$H.

2. Dyestuff of the formula

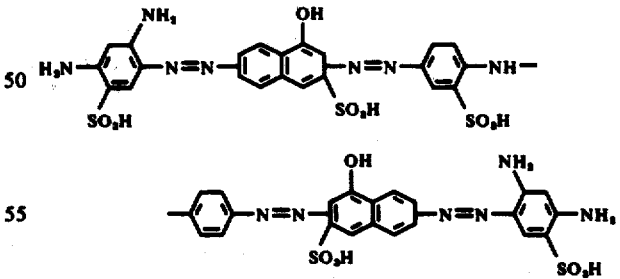

* * * * *